Sept. 9, 1969  R. TISHLER  3,465,771
WATER CONTROL DEVICE
Filed Sept. 16, 1966
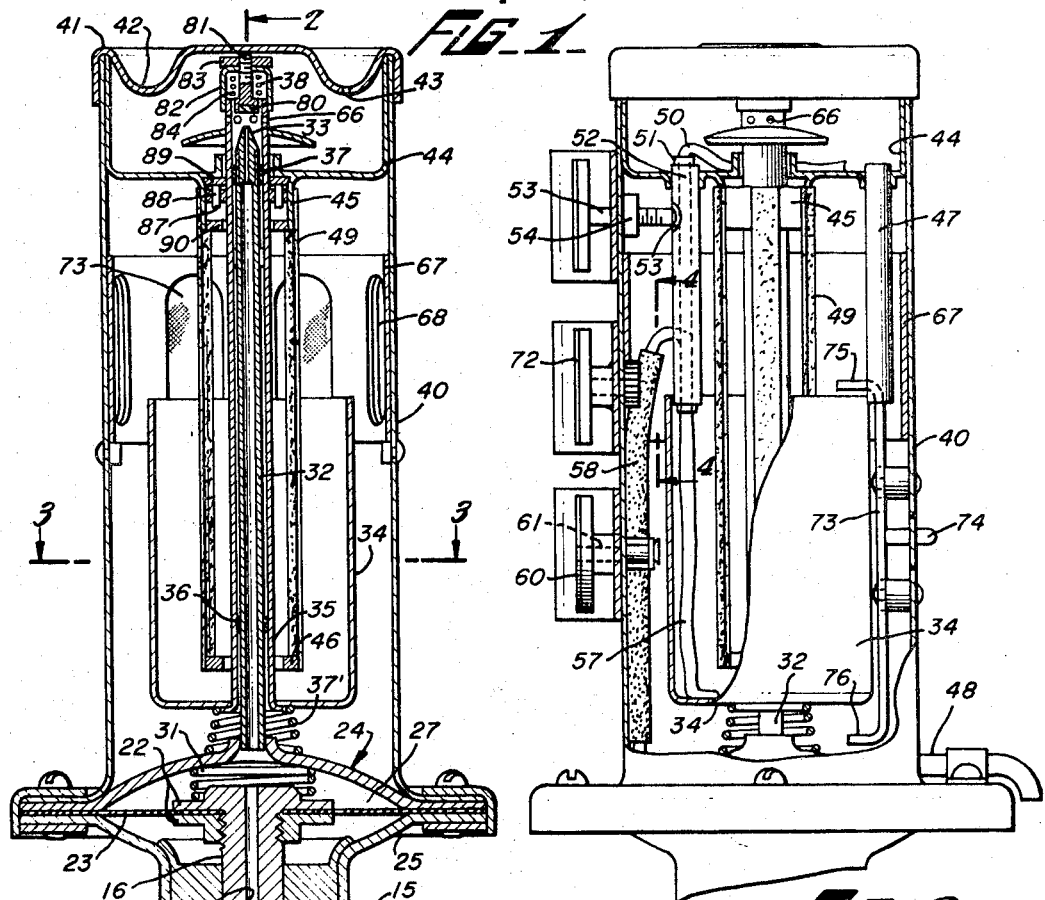
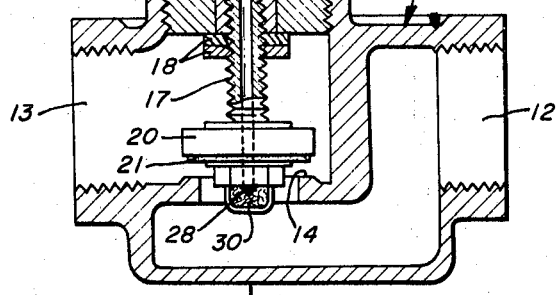
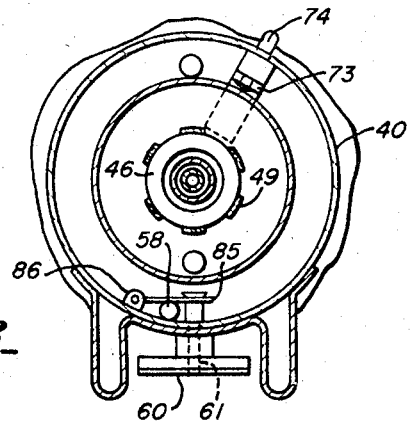
INVENTOR.
RICHARD TISHLER
BY
*Jnl. h. Schmidt*
ATTORNEY.

United States Patent Office 3,465,771
Patented Sept. 9, 1969

3,465,771
WATER CONTROL DEVICE
Richard Tishler, 3650 Willow Crest Ave.,
North Hollywood, Calif. 91604
Filed Sept. 16, 1966, Ser. No. 580,069
Int. Cl. A01g 25/00
U.S. Cl. 137—78                                12 Claims

ABSTRACT OF THE DISCLOSURE

An automatic water regulator in which a main valve is operable by a diaphragm located in a chamber which communicates with the interior of a tubular post having an orifice therein. A water collector is movable along the post but is normally yieldably held in its upper position wherein a control valve carried thereby is held open to permit water from the main valve inlet to flow at a metered rate into the collector. When the collector lowers due to accumulations of water therein, the control valve is closed to enable water pressure to actuate the valve diaphragm, thus closing the main valve. Wick means is provided to remove water from the collector at a relatively slow rate.

---

This invention relates to water controlling systems and has particular reference to automatic water irrigating or sprinkling systems for turning the water on and off at selectively different intervals and for selectively different periods of time.

One object of the invention is to provide a self-contained automatic device of the above type which is highly reliable, compact and economical to manufacture.

Another object is to provide an automatic device of the above type which may be readily regulated both as to the length of time between successive cycles of operation and as to the length of time during which water is allowed to flow.

Another object is to utilize the principle of water evaporation to adjustably control both the length of time between cycles and the length of time during which water is allowed to flow.

Another object is to enable ambient moisture and temperature conditions, particularly rain, to modify the timing of the device.

Another object is to automatically prevent flow of water during raining periods.

Another object is to provide an automatic device of the above type in which the valve action is independent of the pressure in the water system.

Another object is to provide an automatic device of the above type which is readily adaptable to existing plumbing systems.

Another object is to enable manual control of the device independently of the aforementioned automatic feature.

The manner in which the above and other objects of the invention are accomplished will be readily understood upon reference to the following specification when read in conjunction with the accompanying drawing, wherein:

FIG. 1 is a longitudinal sectional view through a water controlling device embodying a preferred form of the present invention.

FIG. 2 is a sectional view, partly broken away and partly in outline, taken substantially along line 2—2 of FIG. 1.

FIG. 3 is a sectional plan view taken along line 3—3 of FIG. 1.

FIG. 4 is a developed view illustrating the means for rotating the sleeve 67 and is taken along line 4—4 of FIG. 2.

Referring to the drawing, the device comprises a valve body 11 having an inlet 12, an outlet 13 and a valve port defined by an annular valve seat 14. The body may typically be part of an existing manually operable valve located in a sprinkling or irrigation plumbing system.

A guide bushing 15 is screw threaded into the body 11 and forms a sliding bearing for a two part valve stem 16, 17. The part 17 is threaded into part 16 and may be locked in different adjusted positions by lock nuts 18. The nuts 18 also limit upward movement of the valve stem. The part 17 carries a valve member 20 having a relatively soft rubber or plastic annular portion 21 adapted to seal against the seat 14 to close off flow of water through the body 11.

The stem part 16 is secured by flanges 22 to the central portion of a flexible diaphragm 23 which is clamped around its periphery between top and bottom walls 24 and 25 of a diaphragm chamber, the latter wall 25 being integral with the bushing 15.

A longitudinally extending passage 26 is formed throughout the length of the valve stem parts 16, 17 to communicate the inlet of the valve body 11 with the upper or high-pressure section 27 of the diaphragm chamber. The lower end of the passage 26 is restricted to form a minute orifice 28 which may typically be on the order of .006 inch diameter and a felt or similar type of filter material 30 is located under the orifice 28 to prevent dirt, sand or the like from clogging the orifice. The orifice 28 acts to restrict the flow of water in the passage 26.

A light compression spring 31 urges the diaphragm and valve member downwardly toward the seat 14. However, the spring is not effective in itself to close the valve against the pressure of incoming water passing into the inlet 12.

A tubular post 32 is mounted on the upper diaphragm chamber wall 24 and its inner passage communicates with the pressure section 27 of the diaphragm chamber. The upper end of the post terminates in a thin lipped orifice 33 of restricted diameter which is preferably about three (3) times the diameter of the lower orifice 28.

A water collector cup 34 surrounds the post 32 and is attached to a tube 35 also surrounding the post. Spaced slide bearings 36 and 37 of plastic or the like are attached to the tube 35 for lengthwise movement along the post and a light compression spring 37' normally holds the cup and tube in their upper illustrated positions when a minimum amount of water is in the cup.

A valve member 38 is carried by the tube 35 at its upper end and is effective, when the collector cup is lowered, to seat against the orifice 33 to close off the passage in the post 32. The valve member comprises a disc 80 of rubber or the like carried by the head of a screw 81. The latter freely passes through a hole in a cap 82 suitably secured to the upper end of the tube 35 and is threadably attached to an adjustable nut 83. A compression spring 84 normally yieldably maintains the valve member in a lowermost position relative to the cap member.

A cylindrical housing shell 40 extends upwardly beyond the cup 34 and is secured at its lower end to the top wall 24 of the diaphragm chamber. The shell is closed at its top by a cap 41 having a depressed annular groove 42 thereabout to catch rain water. A drain hole 43 is formed in the cap to permit rain water caught in the groove 42 to drain onto a cup-shaped water container 44 secured within the shell 40. The container has a depending hub portion 45 to which are secured the upper ends of a series of spaced capillary wicks 49 of cotton or the like. The latter are spaced around the hub 45 (see also FIG. 3) and extend downwardly into the cup 34 and are held adjacent the bottom thereof by a weighted ring 46.

A drain tube 47 extends through and is secured to the container 44. The upper end of the tube 47 terminates a short distance above the container bottom, thus providing an overflow so that any water in the container is maintained at a predetermined and relatively small height above the bottom of the container. Any water draining through tube 47 will drain out of the shell 40 through a second drain tube 48.

Water is transferred from the container 44 to the collector cup 34 by a capillary wick 50, the upper end of which lays in the container 44 and the remainder passes through a vertical rubber or soft plastic tube 51 which is encased in a metal sleeve 52 supported at its upper end by the container 44.

For the purpose of regulating the capillary flow of water through the wick 50 and into the cup, an adjusting screw 53, preferably having indicia thereon indicating the timing between successive watering cycles, is threaded in a nut 54 secured to the housing 40 and extends through an opening 55 in the sleeve 52 to abut against the flexible tube 51. By squeezing the wick 50 varying amounts by means of the screw 53, the rate of flow of water into the cup 34 may be regulated over a relatively wide range.

Removal of water from the collector cup 34 is effected both by evaporation through the wicks 49 and also by capillary action by an additional capillary wick 57, one end of which lies on the bottom of the cup and the other end is encased in a rubber or soft plastic tube 58 which is suitably secured to the interior of the housing shell 40. An adjusting nut 60, preferably having indicia thereon indicating the length of time the water flows during each cycle, is rotatably mounted in the wall of the shell 40 and is screw threaded over a screw 61 attached to an arm 85 (FIG. 3) pivotally supported at 86. Thus, by rotating the nut 60 the wick can be constricted various amounts to regulate the flow rate of water therethrough.

A snap-action device is provided to yieldably urge the collector cup and valve member 38 into both its upper illustrated position and its lower position wherein the valve member 38 closes the upper orifice 33. Such device comprises a non-magnetic ring 87 attached to the tube 35 and supporting a pair of vertically extending permanent magnets 88. In the upper position of the collector cup 34, the magnets engage an annular disc 89 of magnetic material carried by the hub 45, thereby exerting a relatively strong upward pull. On the other hand, when the cup 34 is moved to its lower position the magnets engage a second annular disc 90 of magnetic material, also carried by the hub 45, thereby exerting a relatively strong downward pull to hold the valve member 38 closed.

Describing now the operation of the device, when the cup 34 is nearly empty of water, it is held in its upper illustrated position by the magnets 88 and spring 37. Since the orifice 33 is larger than the orifice 28 no pressure is built up in the pressure section 27 of the diaphragm chamber at this time and water under pressure in the inlet 12 will force the valve member 20 open and will flow through the outlet. During this time, some water is also forced through the passage 26, into the pressure section 27 and through the tubular post 32, past the now opened valve member 38 and outwardly through openings 66 in the tube 35 from whence it is collected in the container 44. The wick 50 slowly transfers the water by capillary action at a controlled rate from the container 44 into the cup 34 and when the latter has been filled to a short distance below its upper edge the accumulated weight overcomes the magnets 88 and spring 37, lowering the cup and causing the valve member 38 to close off the passage in the post 32. As the water continues to be forced through the passage 26 it will build up pressure in the diaphragm pressure section 27 causing the diaphragm to force the valve member 20 downwardly to engage the valve seat 14 and thus shut off the flow of water in the valve. The wicks 49 now slowly raise the water from the cup 34 by capillary action to facilitate evaporation and at the same time the wick 57 drains additional water from the cup 34 at a controlled rate. When a sufficient amount of water is removed from the cup, the spring 37 will overcome the downward pull of the magnets 88 and will raise the same to its original upper position, opening the valve member 38 to relieve pressure in the diaphragm pressure section 27 and thus permit water to again pass through the valve port 14. Also, water will again accumulate in the container 44 so that it may again be transferred to the collector cup to continue the above noted cycling.

Means are provided for controlling the rate of evaporation of water from the wicks 49 and thus supplement the action of the adjusting nut 60. This comprises a cylindrical sleeve or shutter 67 rotatable within the housing shell 40. Both the sleeve and the shell are provided with spaced openings 68 which, in one position of the sleeve, register with each other to permit a maximum flow of air through the housing. The sleeve 67 has a rack gear section 70 (FIG. 4) which meshes with a pinion 71 carried by the shaft of a rotatable knob 72. The shaft is rotatably mounted in the wall of the housing 40 and the knob 72 has indicia thereon indicating the rate of evaporation under normal ambient moisture conditions. Rotation of the knob 72 causes similar rotation of the sleeve 67 to effectively close the openings 68 different amounts and thus restrict evaporation varying amounts. A screen 73 is preferably secured to the inside of the sleeve 67 to exclude dirt and dust.

Means are provided to manually raise or lower the collector cup 34 and thus control the flow of water independently of the automatic operation. For this purpose, a slide 73 is slideably mounted within the housing shell 40 for vertical movement and has a knob 74 extending through a suitable vertical slot in the shell. Ears 75 and 76 extend over the top and bottom, respectively, of the collector cup. Such ears are spaced sufficiently from the cup so that when the slide is located in its illustrated intermediate position the ears do not interfere with the operation of the device. However, upon raising of the knob 74 to an upper position, the ear 76 will raise the cup to its upper position wherein it causes the valve member 20 to be opened, whereas lowering of the knob 74 will cause the ear 75 to likewise lower the cup to its lower position wherein it will cause the valve member 20 to be closed.

During rainy periods the device automatically restricts the flow of water accordingly. That is, during such periods, rain water will be caught in the annular groove 42 and will drop through the holes 43 into the container 44 thereby causing the collector cup to be continually maintained full and in its lowered position, thus maintaining the valve member 20 closed. Also, during periods of relatively low humidity the evaporation rate will be faster thereby shortening the time during which the water flow is cut off.

Having thus described the invention, what is desired to be secured by United States Letters Patent is:

1. In a water control system,
the combination with a valve housing having an inlet, an outlet, a valve port intermediate said inlet and outlet, and a valve member for closing said valve port, of
means forming a chamber:
an actuating member in said chamber and connected to said valve member,
said chamber having an expansible pressure section one wall of which is defined by said actuating member,
said valve member having a passage therein communicating said inlet with said pressure section,
an upwardly extending tubular post communicating with said pressure section and terminating in an orifice at its upper end,
a water collector movable along said post,
means for transferring water from said orifice to said collector,
a second valve member adapted to close said orifice,
yieldable means normally maintaining said collector in a raised position, and
means controlled by said collector upon lowering thereof in response to collection of a predetermined amount of water for causing said second member to close said orifice and for moving said second valve member to a position opening said orifice in response to said collector being moved to said raised position, said orifice providing for sufficient venting of said pressure section when said orifice is open such that the inlet fluid pressure will move said first mentioned valve member to open said valve port.

2. The combination according to claim 1 comprising capillary wick means for causing evaporation of water from said collector.

3. The combination according to claim 1 comprising a capillary wick and means suspending said wick exteriorly of said collector and at least partly into said collector.

4. The combination according to claim 1 comprising detenting means for yieldably maintaining said collector in raised and lowered positions.

5. The combination according to claim 1 comprising means forming a water flow restriction opening in said passage, said opening having a smaller area than the area of said orifice.

6. The combination according to claim 1 comprising means for controlling the flow of water by said transferring means whereby to control the duration of flow of water through said valve port.

7. The combination according to claim 1 wherein said transferring means comprises a capillary wick and means for selectively constricting said wick different amounts whereby to control the rate of flow of water to said collector.

8. The combination according to claim 1 comprising a capillary wick for conveying water from said collector, and means for selectively constricting said wick different amounts whereby to control the rate of flow of water from said collector.

9. The combination according to claim 1 comprising a housing surrounding said collector, said housing having a plurality of spaced openings therein permitting evaporation of water from said collector, a shutter member slideable in said housing, said shutter having a second plurality of openings therein, and means for moving said shutter member whereby to move said second plurality of openings into and out of registry with said first mentioned plurality of openings whereby to control the rate of evaporation of water from said collector.

10. The combination according to claim 1 comprising manually operable means for raising and lowering said collector whereby to cause said valve member to open and close said valve port.

11. The combination according to claim 1 wherein said water transferring means comprises a water container having an overflow means for maintaining a constant level of water therein and a capillary wick for conveying water from said container to said collector.

12. The combination according to claim 11 comprising a housing surrounding said collector and said container, and means in said housing for collecting rain water and for directing said rain water to said container.

References Cited

UNITED STATES PATENTS

| | | | |
|---|---|---|---|
| 1,898,248 | 2/1933 | Gaines | 137—624.14 |
| 2,004,194 | 6/1935 | Lacy-Mulhall | 239—65 XR |
| 2,577,337 | 12/1951 | Lancaster | 239—65 |
| 2,619,981 | 12/1952 | Pfiitzner | 137—408 |
| 2,965,117 | 12/1960 | Gallacher | 137—78 |
| 3,270,763 | 9/1966 | Kiefer | 251—65 XR |
| 3,273,579 | 9/1966 | Koculyn | 239—65 XR |

WILLIAM F. O'DEA, Primary Examiner

RICHARD GERARD, Assistant Examiner

U.S. Cl. X.R.

137—408, 491, 624.14; 239—65; 251—65